(12) United States Patent
Stillwagon et al.

(10) Patent No.: US 7,428,131 B2
(45) Date of Patent: Sep. 23, 2008

(54) SAFETY SHIELD FOR USE WITH DIFFERENT DIAMETER RACKING RODS AND AN ADAPTOR FOR USE THEREWITH

(75) Inventors: James R. Stillwagon, Worthington, OH (US); Elihu Hoagland, IV, Louisville, KY (US)

(73) Assignee: Gary Guard, Inc., Hilliard, OH (US)

( * ) Notice: Subject to any disclaimer, the term of this patent is extended or adjusted under 35 U.S.C. 154(b) by 379 days.

(21) Appl. No.: 11/343,103

(22) Filed: Jan. 30, 2006

(65) Prior Publication Data

US 2006/0176623 A1      Aug. 10, 2006

Related U.S. Application Data

(60) Provisional application No. 60/650,899, filed on Feb. 8, 2005.

(51) Int. Cl.
*H02H 3/00*       (2006.01)
*E04G 3/00*       (2006.01)

(52) U.S. Cl. .................... 361/1; 361/119; 361/212; 361/816; 361/835; 248/276.1; 248/279.1; 248/284.1; 248/481; 296/97.6

(58) Field of Classification Search .................. 361/1, 361/816, 835, 119
See application file for complete search history.

(56) References Cited

U.S. PATENT DOCUMENTS

| | | | | |
|---|---|---|---|---|
| 1,147,425 A * | 7/1915 | Ojala | ................. | 294/23.5 |
| 1,353,552 A * | 9/1920 | Sweet | ................. | 296/85 |
| 1,453,685 A * | 5/1923 | Longenbaugh | .......... | 248/279.1 |
| 1,674,538 A * | 6/1928 | Williams | ................. | 248/279.1 |
| 1,994,938 A * | 3/1935 | Bott | ................. | 174/138 D |
| 2,382,147 A * | 8/1945 | Hanak | ................. | 428/99 |
| 2,694,330 A * | 11/1954 | Davies et al. | ........... | 81/345 |
| 3,100,253 A * | 8/1963 | O'Connor | ............. | 219/503 |
| 3,193,017 A * | 7/1965 | Walker | ................. | 169/48 |
| 3,336,651 A * | 8/1967 | La Jeunesse | ........... | 29/237 |
| 3,866,965 A * | 2/1975 | Homeier | ............. | 294/19.1 |
| 4,230,357 A * | 10/1980 | Bosch et al. | ........... | 294/19.1 |
| 4,397,491 A * | 8/1983 | Anderson | ........... | 294/64.1 |
| 4,453,562 A * | 6/1984 | Palkovics | ............. | 137/382 |
| 4,461,423 A * | 7/1984 | Davis | ................. | 239/231 |
| 5,024,405 A * | 6/1991 | McGuire | ............. | 248/73 |
| 5,077,448 A * | 12/1991 | Andrew | ................. | 174/5 R |
| 5,453,587 A * | 9/1995 | Hurley et al. | ........... | 200/50.24 |
| 5,477,017 A * | 12/1995 | Swindler et al. | ........ | 200/50.24 |
| 5,666,253 A * | 9/1997 | Whited et al. | ........... | 361/1 |
| 6,210,206 B1 * | 4/2001 | Durham | ............. | 439/416 |
| 6,336,599 B1 * | 1/2002 | Herr et al. | ............. | 239/522 |
| 6,478,589 B2 * | 11/2002 | Robinson et al. | ........ | 439/146 |
| 6,735,066 B2 * | 5/2004 | Steffen | ................. | 361/119 |

* cited by examiner

*Primary Examiner*—Lincoln Donovan
*Assistant Examiner*—Christina Russell
(74) *Attorney, Agent, or Firm*—Sand & Sebolt

(57) ABSTRACT

A protective shield that may be secured to an electrical racking rod of the type used for performing electrical work on various types of energized electrical equipment. The protective shield includes a transparent plate formed of an impact resistant, fire retardant material; a clamping mechanism secured to the plate and at least one adaptor for securing the racking rod to the plate. The adaptor is engaged by the clamping mechanism to secure the racking rod to the plate. The protective shield provides physical protection to workers when removing or resetting electrical circuit breakers by acting as a barrier between the worker and the equipment while providing complete visibility to the task being performed. A plurality of adaptors may be provided to enable the plate to be utilized with any one of a plurality of different diameter racking rods.

20 Claims, 7 Drawing Sheets

SAFETY SHIELD FOR USE WITH DIFFERENT DIAMETER RACKING RODS AND AN ADAPTOR FOR USE THEREWITH

CROSS-REFERENCE TO RELATED APPLICATIONS

This is a standard utility application claiming priority from U.S. Provisional Application Ser. No. 60/650,899, filed Feb. 8, 2005, the entire specification of which is incorporated herein by reference.

BACKGROUND OF THE INVENTION

1. Technical Field

The invention relates to a protective safety shield for use in the electrical industry. More particularly, the invention relates to a safety shield that may be clamped to different diameter racking rods and can be used to protect workers from electrical arcs, flashes and fragmentation explosions which can occur while opening and closing circuit breakers.

2. Background Information

Tripping and resetting electrical circuit breakers can pose a serious threat of injury to electrical workers because of the potential risk of the occurrence of electrical arcs, electric flashes and fragmentation explosions. These arcs, flashes or explosions are capable of causing electrical burns, molten metal burns and flesh wounds caused by flying debris.

Circuit breakers are typically mounted in a protective cabinet. In order to perform routine maintenance and repair, the worker has to open the cabinet and, using a racking rod, shift the breakers either vertically or horizontally in order to disconnect them from the power source. The breakers are then removed from the cabinet and the necessary maintenance or repair is performed. When the work is completed, the breakers are replaced in the cabinet and then, using the racking rod, are moved either vertically or horizontally back into connection with the power source. Both the tripping and resetting require the worker to be located close enough to reach the cabinet with the racking rod and this puts them at risk because the circuit is energized when it is tripped and become energized when it is being reset.

Various devices have been proposed in the art to assist and protect the worker during the tripping and resetting of the breaker. These devices have included different types of hot sticks, eye protection, hard hats, flame retardant clothing and gloves. Yet other devices have included mechanized systems for moving and placing breakers in order to allow the worker to remain at a slightly safer distance from the equipment. There is, however, no way for the worker to maintain a completely safe distance when the breakers are tripped and reset.

U.S. Pat. No. 5,666,253, assigned to the present assignee, discloses a shield that physically protects linemen using a hot stick as they work. The shield protects the worker from electrical arcs, electrical flashes and fragmentation explosions and from objects and debris produced during the pulling of pad-mounted switches, the insertion of fuses into overhead transformers or numerous other applications. This shield includes a plate formed of a transparent material and a clamping means for removably mounting the plate to the hot stick. However, the hot sticks used in conjunction with the device proposed by this patent are long and of a fairly large diameter. They are therefore not suitable for opening breaker circuits in more cramped quarters. Tripping and resetting breakers requires the use of racking rods and depending on the application, racking rods of different diameters may need to be utilized. All of these racking rods are significantly smaller in diameter than the hot sticks used for working on overhead lines.

There is therefore a need in the art for a protective shield that can be used in conjunction with a plurality of different diameter hot sticks or racking rods for tripping and resetting differently sized circuit breakers in close quarters.

SUMMARY OF THE INVENTION

The device of the present invention comprises a protective shield that may be secured to an electrical racking rod of the type used for performing electrical work on various types of energized electrical equipment. The protective shield comprises a transparent plate formed of an impact resistant, fire retardant material; a clamping mechanism secured to the plate and at least one adaptor engageable by the clamping mechanism for securing the racking rod to the plate. The plate includes an opening through which the racking rod is passed. The adapter has a collar which can pass through the opening and a shoulder which cannot pass through the opening. The adapter further includes an internal axial bore within which a section of the racking rod is retained. The clamping mechanism engages the collar of the adaptor and holds it in such a position that the plate is disposed between the clamping mechanism and the shoulder of the adaptor. The adaptor holds the racking rod in such a position that it lies substantially right angles to the plate. A secondary shield may be mounted to the clamping mechanism to protect that portion of the adaptor that extends through the opening. A plurality of adaptors may be provided to enable the plate to be utilized with any one of a plurality of different diameter racking rods.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numbers refer to similar parts throughout the drawings.

DESCRIPTION OF THE PREFERRED EMBODIMENT

Figure 1:
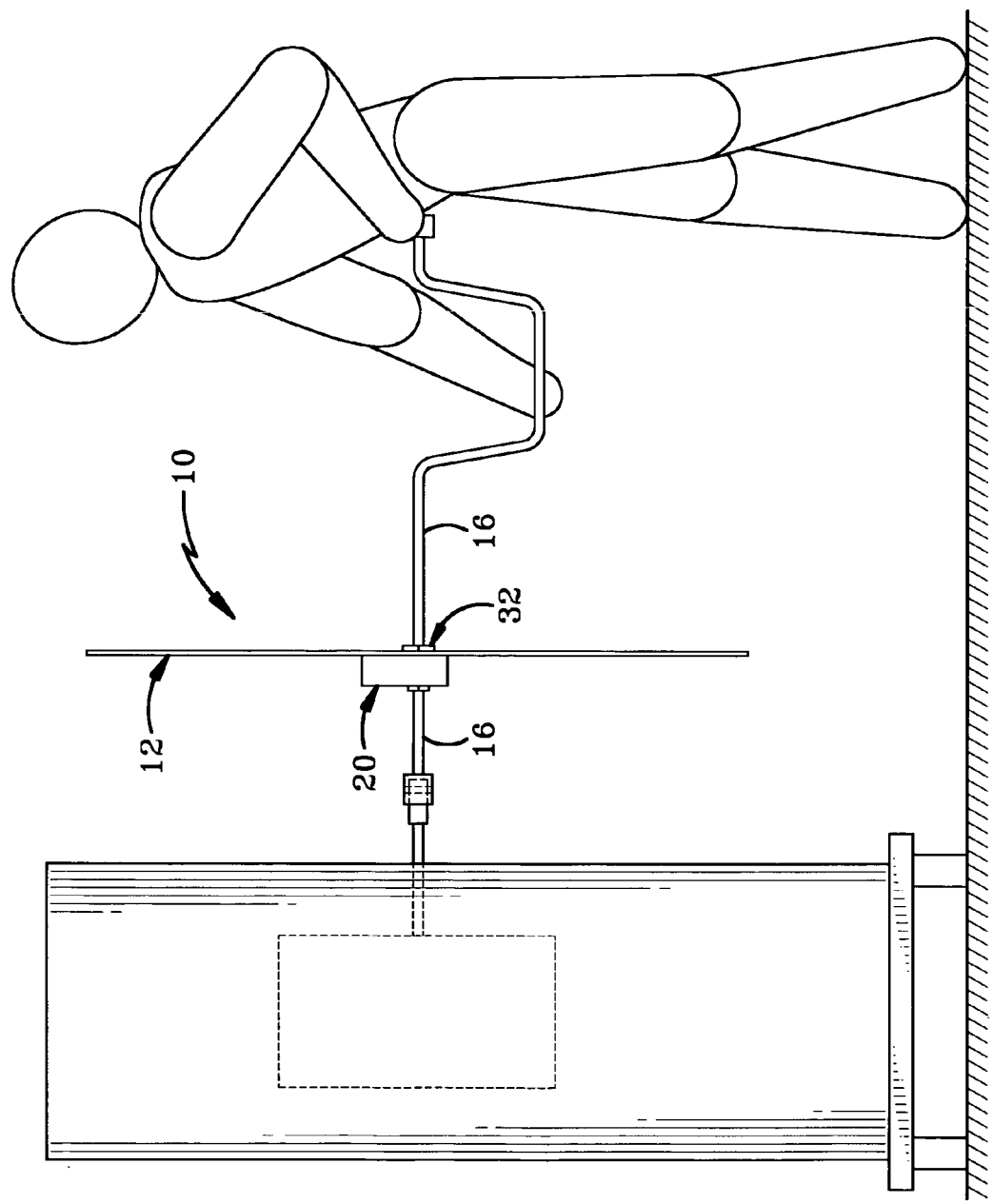
FIG. 1 is a diagrammatic plan view of a worker using the protective shield in accordance with the present invention.
Figure 2:
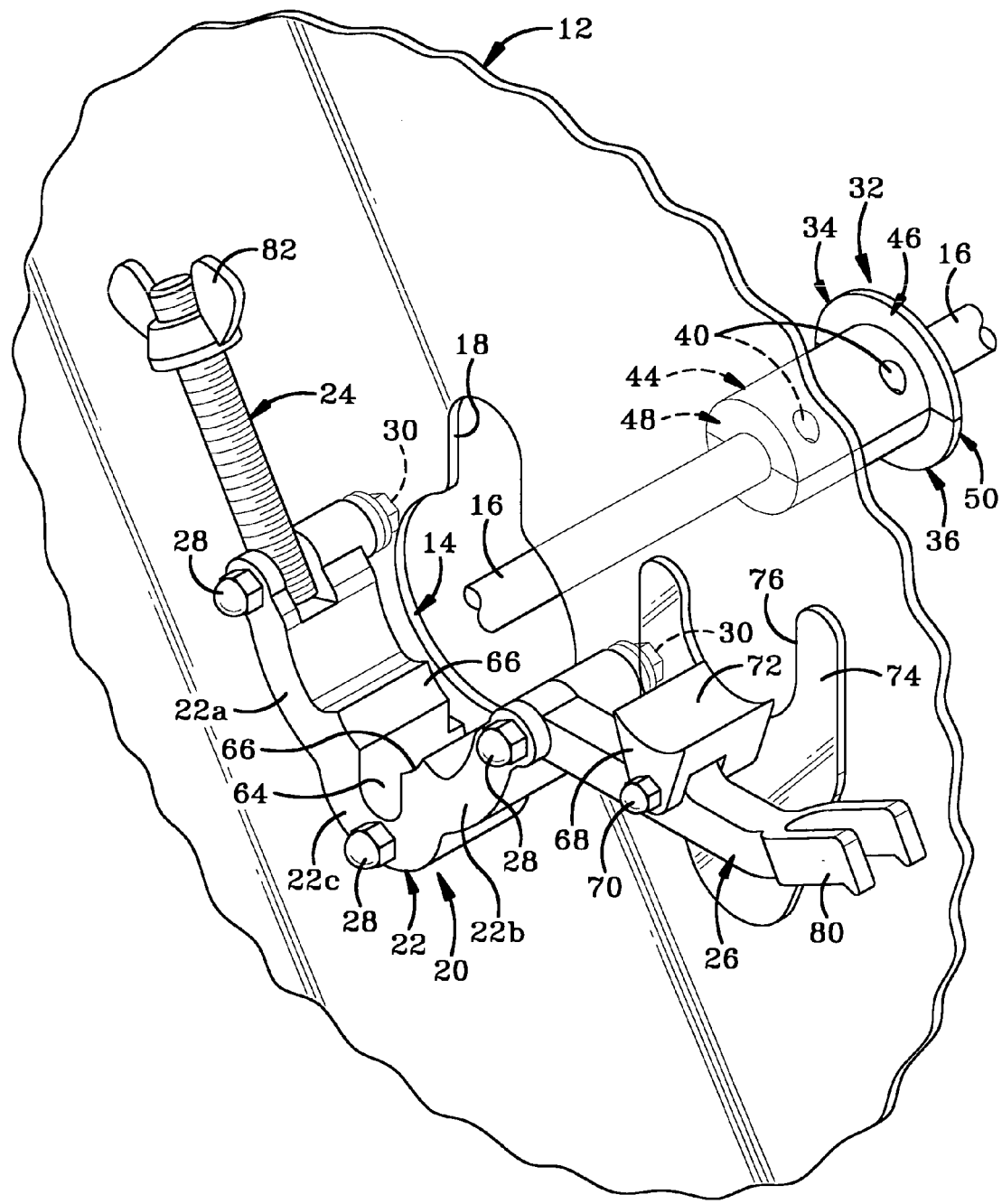
FIG. 2 is a partial perspective view of a safety shield in accordance with the present invention and showing an adaptor and connected racking rod being inserted through the opening in the shield.

Referring to FIGS. 1-7, there is shown a protective shield in accordance with the present invention and generally indicated at 10. Shield 10 includes a plate 12, preferably formed from a transparent, flame-retardant plastic material such as polycarbonate, and a clamping mechanism 20 for engaging a racking rod 16 as will be described hereafter. Plate 12 preferably is formed with a central opening 14 therein through which racking rod 16 is inserted. Clamping mechanism 20 locks racking rod 16 to shield in such a manner that a portion of the rod extends outwardly from either side of plate 12. Opening 14 may include a slot 18 (FIG. 2) that allows rod 16 to be more easily inserted through opening 14. Clamping mechanism 20 is mounted on plate 12 by fastening bolts 28 and associated nuts 30 and washers. Clamping mechanism 20 includes a base 22 that is secured to plate 12, a bolt arm 24 and clamp arm 26 that is pivotally mounted on base 22. Clamp arm 26 is pivotable between an open position and a closed position. When clamp arm 26 is in the open position, racking rod 16 may be moved relative to shield 10. When the clamp arm is in the closed position, racking rod 16 is locked within clamping mechanism 20 and is prevented from moving relative to shield 10. Clamping mechanism 20 is designed to clamp around racking rod 16 so that rod 16 lies in a plane that is substantially perpendicular to plate 12 (FIG. 1). The structure and functioning of clamping mechanism 20 is described in detail in U.S. Pat. No. 5,666,253, the entire specification of which is incorporated herein by reference.

In accordance with a specific feature of the present invention, an adaptor 32 is provided to enable clamping mechanism 20 to tightly engage a racking rod 16 that has a diameter which is significantly smaller than the diameter of opening 14. Adaptor 32 comprises a collar 44, which has a diameter smaller than that of opening 14 and can therefore pass through opening 14; and a shoulder 46 that is concentric with collar 44 and extends outwardly away from collar 44. Shoulder 46 has a greater diameter than that of opening 14 and consequently shoulder 46 of adaptor 32 cannot pass through opening 14. Adaptor 32 is provided with an axial bore 56 (FIG. 5) through which rod 16 is inserted. Bore 56 preferably is substantially equal in diameter to rod 16 so that adaptor 32 tightly engages rod 16. Clamping mechanism 20 engages collar 44 of adaptor 32 and thereby retains rod 16 in locking engagement with shield 10.

Figure 3:
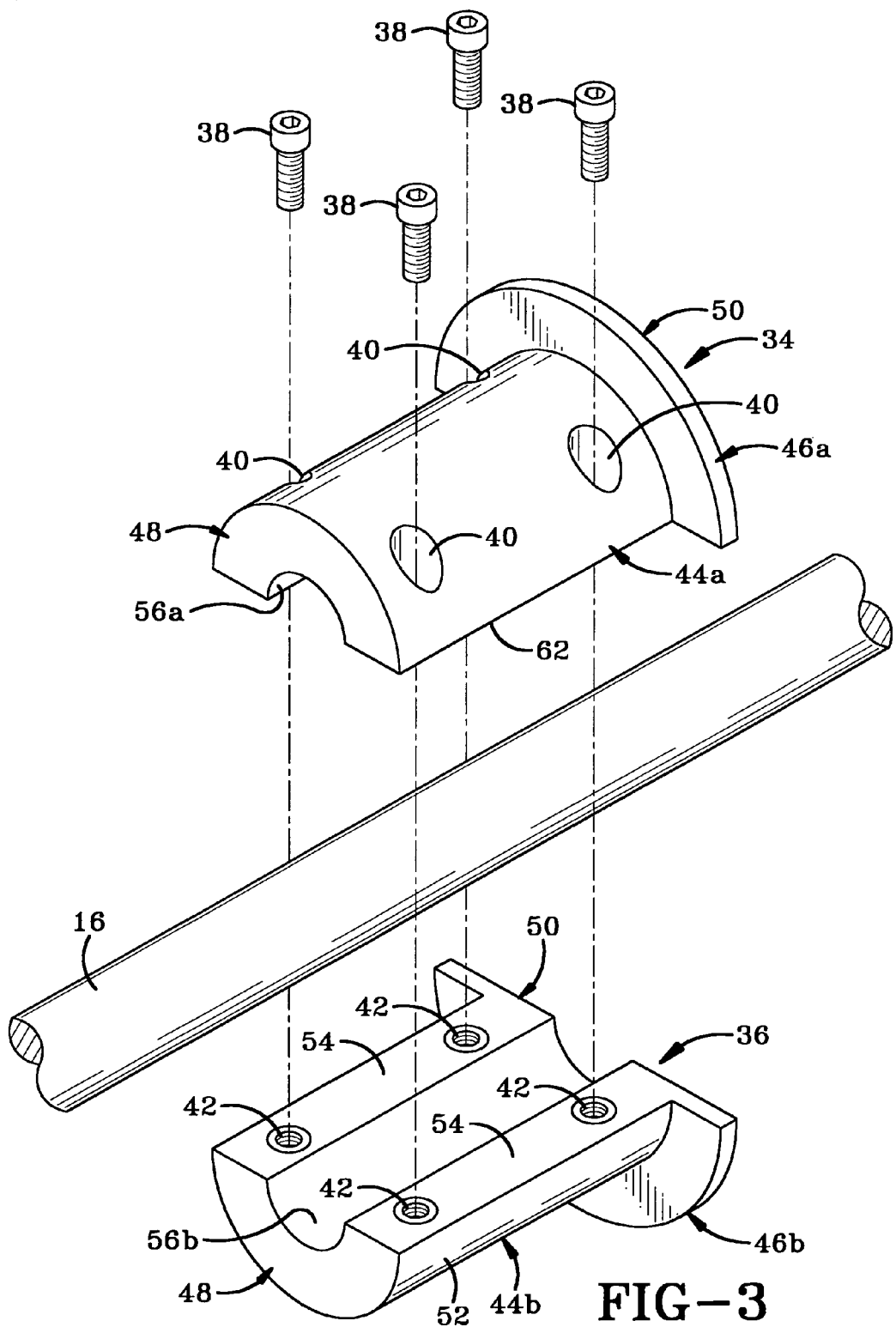
FIG. 3 is an exploded perspective view of the adaptor of the present invention being positioned around a racking rod.

In accordance with a preferred embodiment of the invention, and as seen in FIG. 3, adaptor 32 preferably is comprised of first and second clamping members 34, 36 that are releasably secured together. First clamping member 34 comprises a generally C-shaped collar section 44a with a shoulder section 46a extending outwardly away from collar section 44a. Collar section 44a has an arcuate outer wall 60 and a substantially planar wall 62 having a semi-circular channel 56a formed therein. Shoulder section 46a extends outwardly from outer wall 60. Second clamping member 36 comprises a generally C-shaped collar section 44b with a shoulder section 46b extending outwardly away from therefrom. Collar section 44b has an arcuate outer wall 52 and a substantially planar wall 54 having a semi-circular channel 56b formed therein. Shoulder section 46b extends outwardly away from outer wall 52 of collar section 44b.

When first and second clamping members 34, 36 are secured together, planar walls 62 and 54 are disposed in abutting contact with each other. Collar sections 44a and 44b form the adaptor's collar 44; the shoulder sections 46a and 46b form the adaptor's shoulder 46 and channels 56a and 56b together form the axial bore 56 of adaptor 32. Adaptor 32 is therefore a substantially tubular member having a central axial bore 56 for receiving racking rod 16 therethrough and having a circumferential shoulder 46 radiating outwardly away from the outer wall of the collar section 44 to prevent the rod 16 and adaptor 32 from passing through opening 14 in plate 12. The adaptor 32 has a first end 48 which constitutes an end wall of collar 44; and a second end 50 which constitutes an end wall of shoulder 46.

Figure 3A:
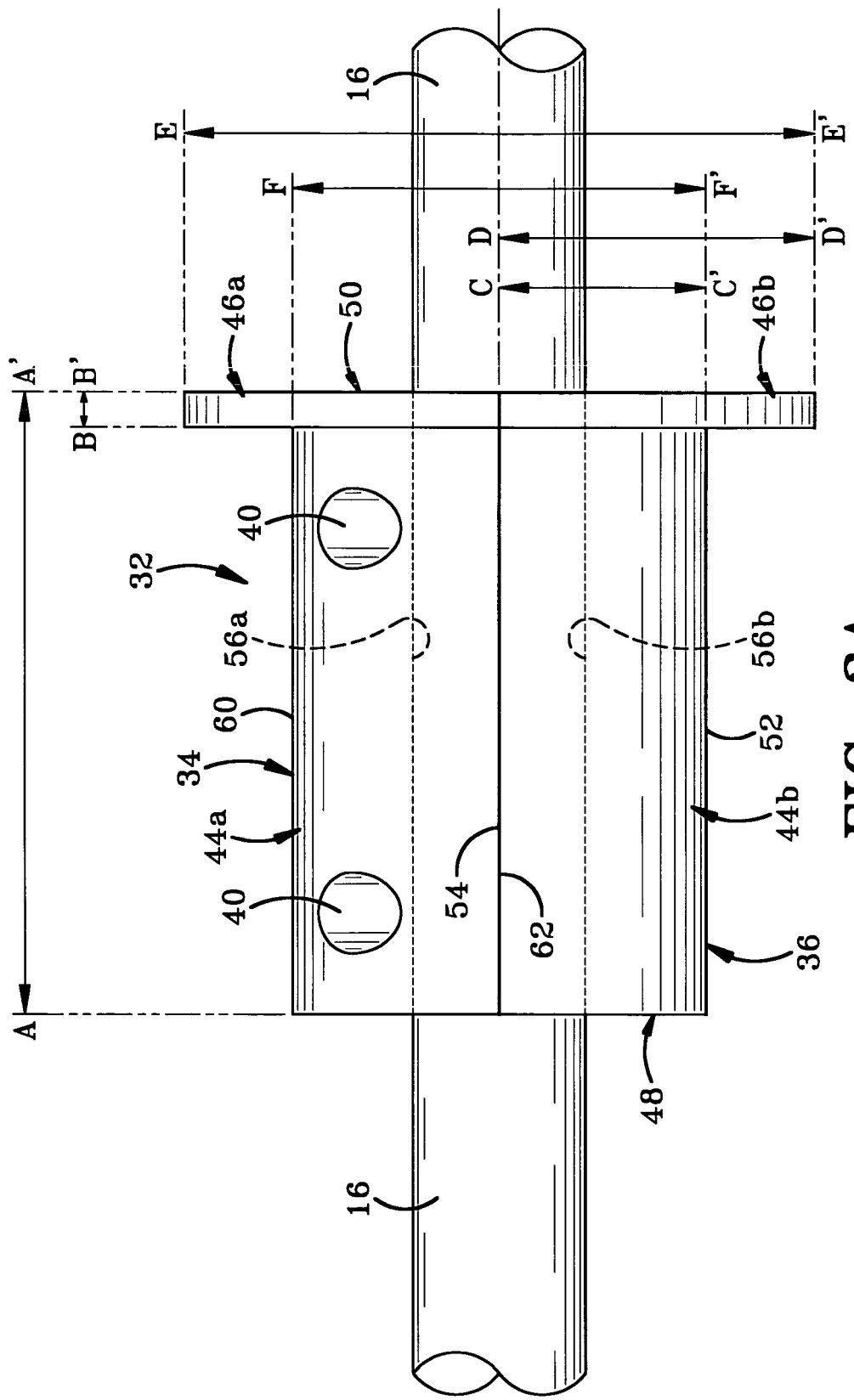
FIG. 3A is a side view of the adaptor in accordance with the present invention and engaged with the racking rod.
Figure 4:
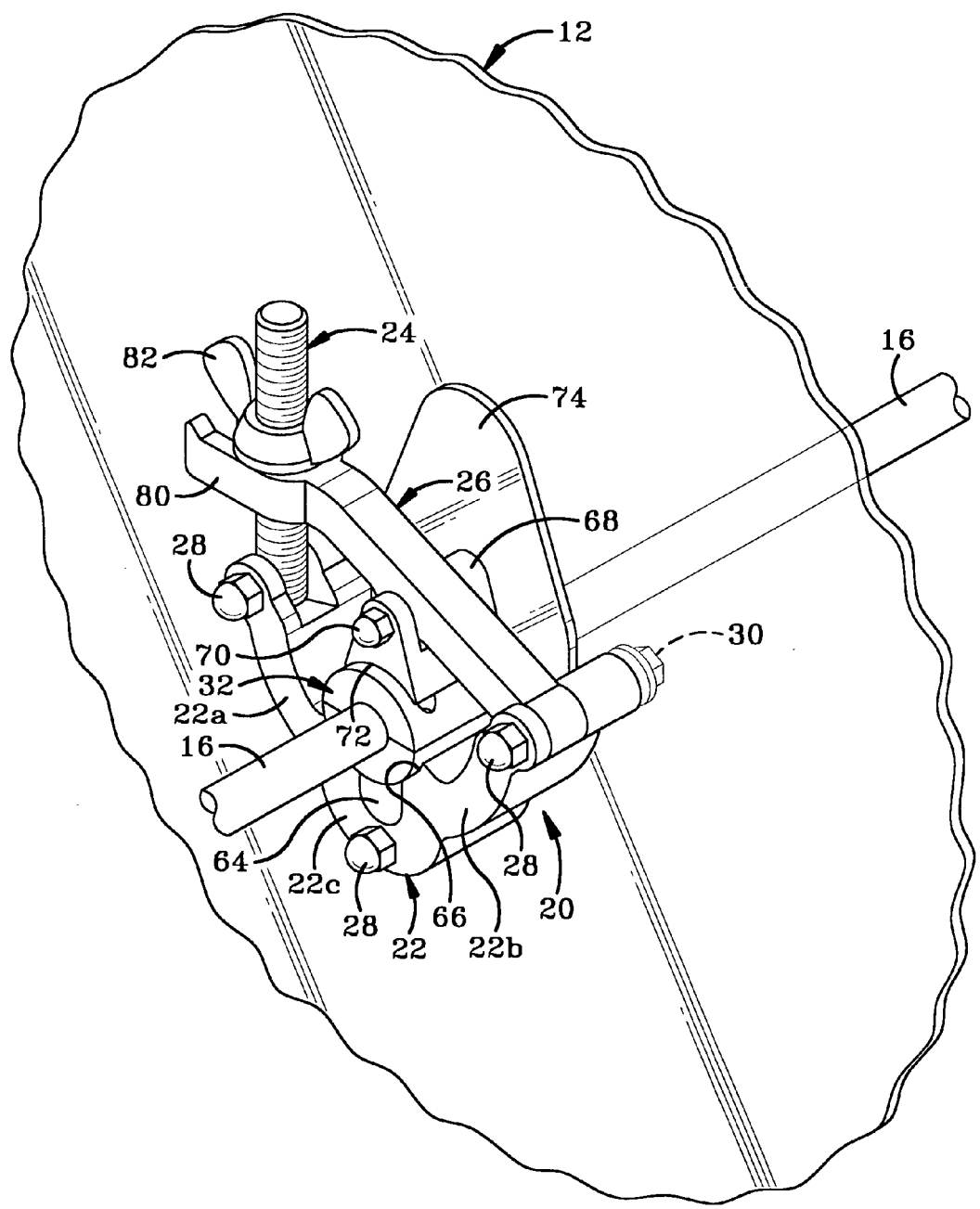
FIG. 4 is a partial perspective view of the safety shield engaged with an adaptor and its connected racking rod.
Figure 5:
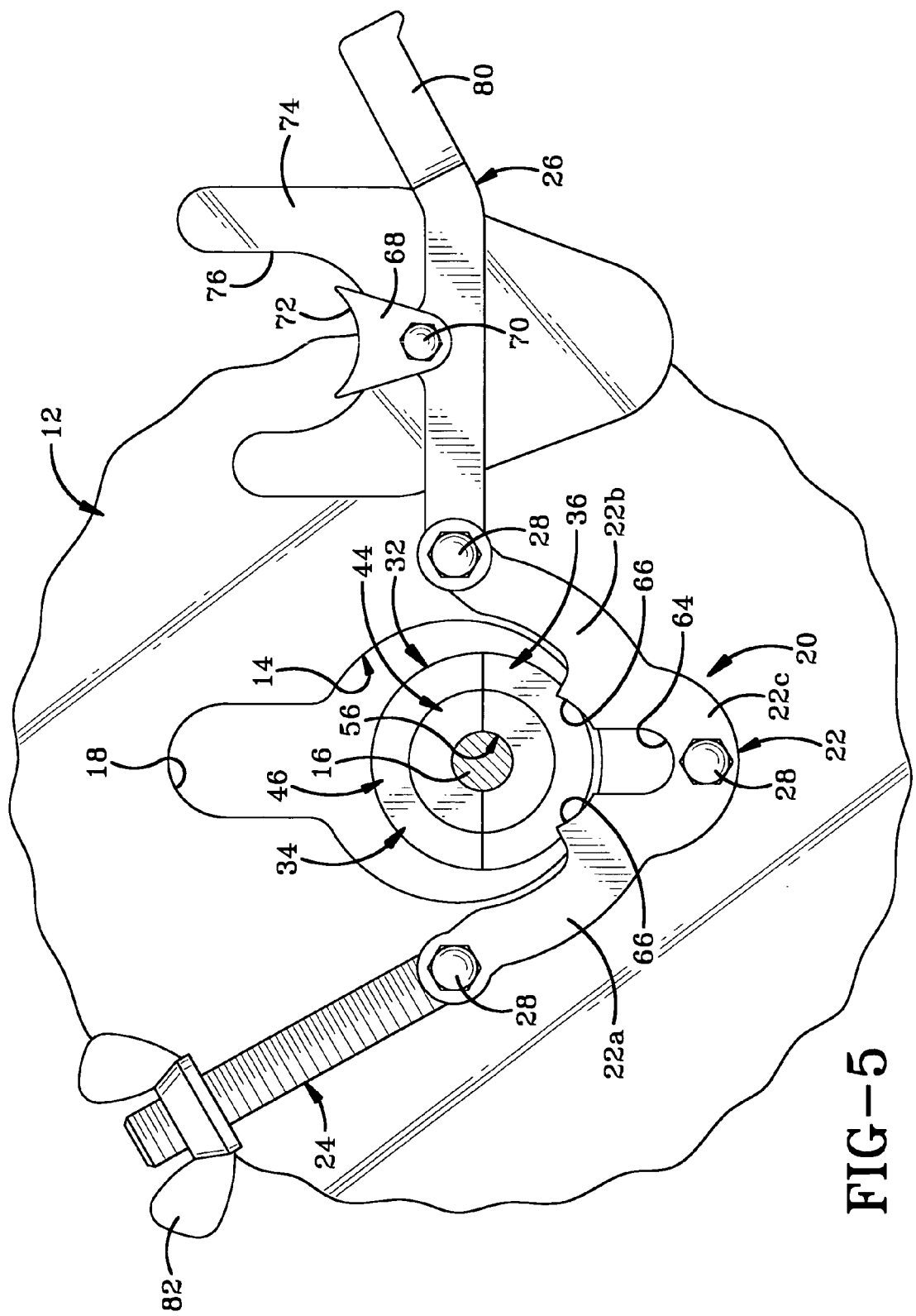
FIG. 5 is a frontal fragmentary view of the protective shield of FIG. 3 showing the clamping mechanism is an open position.
Figure 6:
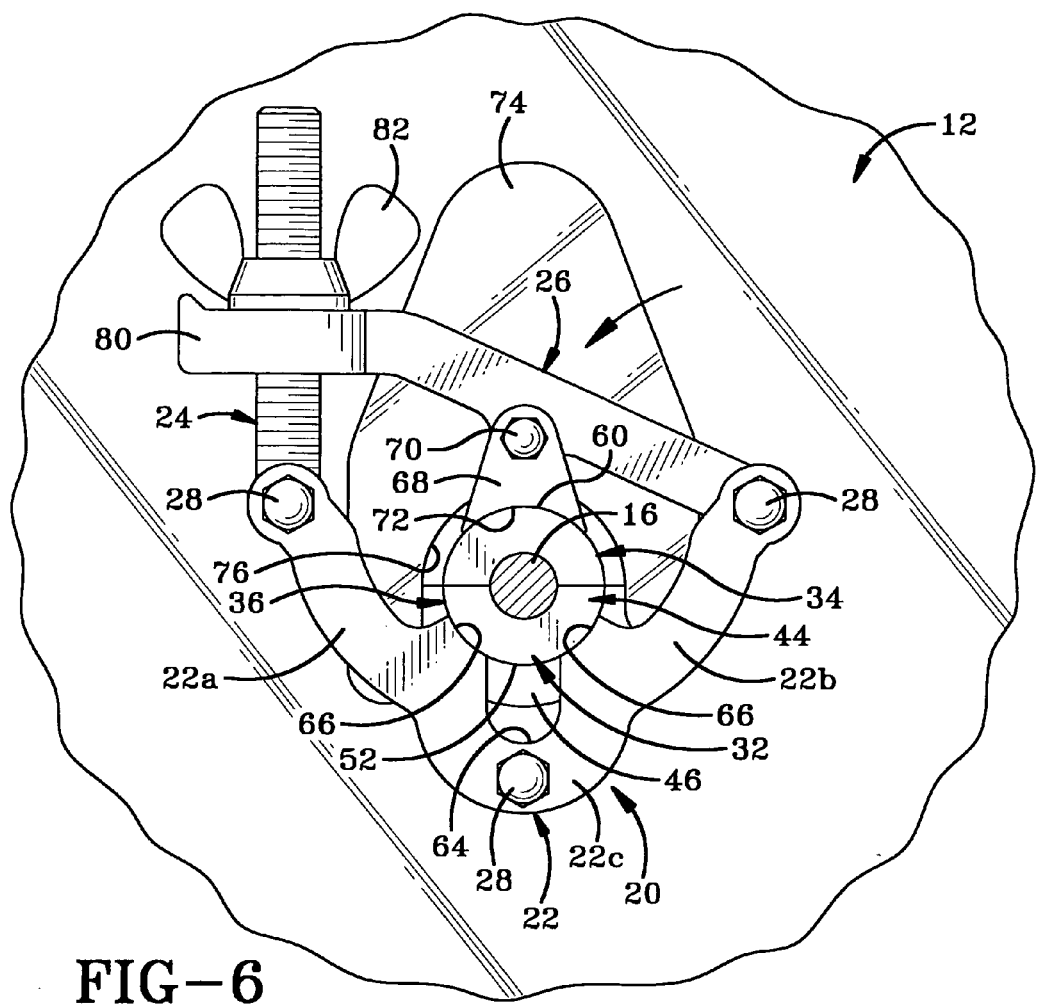
FIG. 6 is a frontal fragmentary view of the protective shield of FIG. 4 showing the clamping mechanism engaged with the adaptor.
Figure 7:
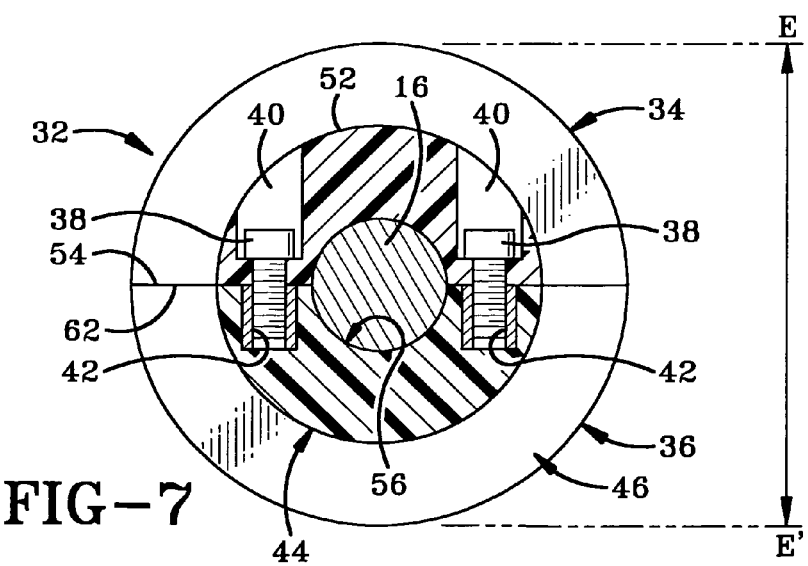
FIG. 7 is a partial cross-sectional front view through the adaptor when engaged with the racking rod.

As may be seen in FIG. 3A, adaptor 32 has a total length A-A' of around 2⅛ inches, collar 44 is about 2 inches long and shoulder 46 has a length B-B' of about ⅛ inch. The radius C-C' of each of the collar sections 44a, 44b is smaller than the radius D-D' of each of the shoulder sections 46a, 46b. The diameter E-E' of shoulder 46 is about 2 5/16 inches and the diameter F-F' of collar 44 is about 1¼ inches.

First and second clamping members 34, 36 are adapted to be positioned around the circumferential outer wall of racking rod 16 so that rod 16 is received within the bore 56 formed by channels 56a and 56b. First and second clamping members 34, 36 are locked together around rod 16 by a plurality of fasteners 38. Fasteners 38 are inserted through apertures 40 in first clamping member 34 and screwed into aligned threaded screw holes 42 in second clamping member 36. Rod 16 is thereby clamped between first and second clamping members 34, 36 so that it cannot slide longitudinally within bore 56. Adaptor 32 and rod 16 therefore move as if they were a unitary member. It will be understood that any other type of suitable securing mechanism could be used on adaptor 32 to securely lock rod 16 therein.

In use, adaptor 32 is used to connect shield 10 and racking rod 16 in the following manner. If racking rod 16 has a diameter of ⅝ inch for example, then an appropriately sized adaptor 32 (i.e., an adaptor having a bore 56 of slightly more than ⅝ inch) is utilized. Second clamping member 36 of adaptor 32 is positioned to receive rod 16 in channel 56b. First clamping member 34 is placed over second clamping member 36 so that rod 16 is received in channel 56a and planar walls 54 and 62 abut each other. Fasteners 38 are inserted through apertures 40 in first clamping member 34 and into internally threaded holes 42 in second clamping member 36. Fasteners 38 are screwed into holes 42 until first and second clamping members 34, 36 cannot be separated from each other and rod 16 is substantially prevented from sliding longitudinally through bore 56. At this point, racking rod 16 is sufficiently securely held between first and second clamping members 34, 36 so that rod 16 cannot be withdrawn therefrom. A free end (not shown) of racking rod 16 is inserted through opening 14 in shield 10 and rod 16 is passed through opening 14 until collar 44 of adaptor 32 lies within opening 14 and shoulder 46 abuts plate 12 of shield 10.

Clamping mechanism 20 is then engaged to secure adaptor 32 to shield 10. Base 22 of clamping mechanism 20 has a V-shaped configuration (FIGS. 2, 4 and 5) formed by a pair of outwardly extending angled legs 22a and 22b which join together at a curved corner 22c. A U-shaped recess 64 is formed in curved corner 22c, and extends throughout the width of base 22. Arcuate clamping surfaces 66 are formed on each of the base legs adjacent recess 64. Surfaces 66 are adapted to engage with collar 44 of adaptor 32. The outer ends of legs 22a and 22b are each formed with a central recess (not shown) through which bolts 28 are passed to secure bolt arm 24 and clamp arm 26 thereto. Arms 24, 26 can be pivoted between an open position (FIG. 2) and closed position (FIG. 4) and in a plane substantially parallel to that of plate 12.

A rocker shoe 68 is pivotally attached to clamp arm 26 by a bolt 70. Rocker shoe 68 pivots in the same plane as clamp arm 26 with respect to plate 12. Rocker shoe 68 has a generally triangular shape with a concave shaped outer surface 72. When clamping mechanism 20 is moved into the closed position, clamping surfaces 66 of base 22 engage outer wall 52 of second clamping member 36 and concave surface 72 of rocker shoe 68 engage outer wall 60 of first clamping member 34. Racking rod 16 is thereby securely engaged with shield 10.

A secondary shield 74 is preferably attached to rocker shoe 68 and is disposed between the rocker shoe and plate 12. Secondary shield 74 is fastened to rocker shoe 68 by bolt 70. Shield 74 preferably is formed with a U-shaped opening 76 for receiving a portion of the collar 44 of adaptor 32 therein when adaptor 32 is inserted through opening 14. The secondary shield 74 is shaped and sized to cover portions of opening 14, such as slot 18 and the annular area between adaptor 32 and the periphery of opening 14. The interior surface of shoulder 46 abuts the surface of secondary shield 74 and aids in preventing adaptor 32 from being drawn through opening 14. Secondary shield 74 is automatically positioned around a portion of adaptor 32 when clamp arm 26 is pivoted into a closed and clamped position.

A yoke 80 is provided at the second end of clamp arm 26, for engaging bolt arm 24 when clamping mechanism 20 is moved into a closed position. A fastener 82, such as a wing nut, is adjustably mounted on a threaded portion of bolt arm 24. When yoke 80 is engaged with bolt arm 24, fastener 82 is rotated so as to engage yoke 80 and thereby secure arm 26 in its closed and locked position. When fastener 82 is tightened, concave surface 72 of rocker shoe 68 is pressed firmly against adaptor 32 as described above and therefore adaptor 32, and therefore rod 16 are locked into engagement with shield 10.

It will be understood that a plurality of racking rods of different diameters can be connected to shield 10 by utilizing a plurality of different adaptors. Each of the adaptors will preferably have a collar 44 of diameter F-F' and a shoulder 46 of diameter E-E', but the diameter of the central axial bore 56 will differ from one adaptor to another. The different diameter bores will correspond to the various racking rod diameters so that any of the rods will be able to be securely retained within the appropriate adaptor and can therefore be secured to shield 10. So, for example, adaptors 32 will be manufactured having an interior bore 56 with a diameter of substantially ½ inch, ⅝ inch, 1 inch etc. These adaptors are designed to respectively receive rods 16 having diameters of substantially ½ inch, ⅝ inch, 1 inch diameter etc. The worker would simply select the appropriate racking rod for the job and then select the appropriate adaptor for use with that racking rod and the shield. If a different diameter racking rod is needed, the first adaptor and racking rod are removed and a second diameter racking rod and the appropriate adaptor are engaged with the shield. For ease of use, the appropriate adaptor may be kept permanently attached to the complementary sized racking rod.

In accordance with another of the features of the invention, the protective shield 10 can be removed easily from the racking rod 16 by disengaging rod from clamping mechanism 20. Shield 10 can then be stored and carried in a protective carrying case.

In summary, the protective shield of the present invention provides a relatively simple and inexpensive, yet highly efficient and effective device, which is readily mounted on and removed from various diameter racking rods to protect a worker from electrical arcs, flashes and fragmentary explosions, and in which the shield can be easily removed and placed in a convenient protective storage case and provides the user with protection without restricting his mobility while utilizing the device the invention.

Although the device of the present invention is indicated as being used on a racking rod, it is readily understood to anyone skilled in the art that the device can be used on other types of rods or similar devices for actuating other types of equipment where protection is desired, such as the turning of a valve or other equipment, where injury could occur to the individual, other than with electrical equipment.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved security container is constructed and used, the characteristics of the construction, and the advantageous, new and useful results obtained; the new and useful structures devices, elements, arrangements, parts and combinations, are set forth in the appended claims.

We claim:

1. A protective shield for mounting on a racking rod, said rod having a diameter and a length, wherein the shield comprises:
   a plate defining an opening therein; said opening being of a size greater than the diameter of the racking rod;
   an adaptor comprising a collar and a shoulder and defining a bore therethrough; said adapter being dimensioned so that the collar can pass through the opening but the shoulder cannot; said adapter being adapted to receive a section of the racking rod within the bore; and
   a clamping means mounted on said plate proximate the opening; said clamping means being selectively engageable with the collar of the adaptor when inserted through the opening in the plate; and to thereby secure the adaptor and the racking rod to the plate.

2. The protective shield as defined in claim 1, wherein the shoulder of the adaptor is concentric with the collar and radiates outwardly away therefrom.

3. The protective shield as defined in claim 1, wherein the adaptor comprises a first clamping member and a second clamping member that are detachably secured together.

4. The protective shield as defined in claim 3, wherein the first clamping member includes a collar section and a shoulder section; and the second clamping member includes a collar section and a shoulder section; and when the first and second clamping members are secured together, the collar sections of both of the first and second clamping members together form the collar of the adaptor and the shoulder sections of both the first and second clamping members together form the shoulder of the adaptor.

5. The protective shield as defined in claim 4, wherein the first clamping member further includes a first planar wall having a first channel formed therein; and said second clamping member includes a second planar wall having a second channel formed therein; and when said first and second clamping members are secured together, the first and second planar walls abut each other and the first and second channels form the bore of the adaptor.

6. The protective shield as defined in claim 5, wherein the first clamping member includes a plurality of apertures formed in the collar section thereof, said apertures extending from an outer surface of the collar section of the first clamping member through to the planar wall thereof.

7. The protective shield as defined in claim 6, wherein the second clamping member includes a plurality of internally, threaded apertures formed in planar wall thereof; said threaded apertures being aligned with the apertures formed in the collar section of the first clamping member.

8. The protective shield as defined in claim 7, further comprising a plurality of threaded fasteners which are received through the apertures in the first clamping member and are threadably engaged in the threaded apertures of the second clamping member to secure the first and second clamping members together.

9. The protective shield as defined in claim 3, further including a securing mechanism for locking the racking rod within the bore of adaptor.

10. The protective shield as defined in claim 9, wherein the securing mechanism comprises a plurality of fasteners extending between the first and second clamping members; and when said fasteners are engaged, the racking rod is prevented from moving within the bore of the adaptor.

11. The protective shield as defined in claim 3, wherein each of said first and second clamping members is substantially C-shaped when viewed in cross section.

12. The protective shield as defined in claim 3, wherein the first and second clamping members are substantially identical to one another and each of the first and second clamping members has:
   a first end;
   a second end;
   a substantially planar inner surface extending between the first and second ends; and
   a semi-circular groove formed in the inner surface and extending between the first and second ends.

13. The protective shield as defined in claim 12, wherein each of the first and second clamping members further includes a first arcuate outer surface beginning at the first end and terminating a short distance inwardly from the second end; said first arcuate outer surface having a first radius.

14. The protective shield as defined in claim 13, wherein each of the first and second clamping members further includes a second arcuate outer surface beginning at the second end and terminating at the first arcuate outer surface; said second arcuate outer surface having a second radius that is longer than the first radius of the first arcuate outer surface.

15. The protective shield defined in claim 1, in which the clamping mechanism includes a base, a bolt arm and a clamp arm, said bolt arm and clamp arm being pivotally attached to the base and movable between an open position and a closed clamped position; and wherein said clamp arm further includes a rocker shoe that is pivotally attached thereto.

16. The protective shield defined in claim 1, further comprising a secondary shield mounted the rocker shoe of the clamping mechanism and being positioned so as to protect at least a portion of the adaptor when the collar of the adaptor is inserted through the opening in the plate.

17. The protective shield as defined in claim 1, wherein the plate is formed from a transparent, flame retardant material.

18. A protective shield for selectively mounting on any one of a plurality of varied diameter racking rods, the shield including:
   a plate formed of a transparent, flame retardant material; said plate defining an opening therein; said opening being of a size sufficiently great enough to receive the largest diameter racking rod therethrough;
   a clamping means mounted on said plate proximate said opening; and
   a plurality of adaptors for selective engagement with the clamping means; each of said adaptors individually having a collar portion that can pass through the opening in the plate and a shoulder portion that cannot pass through the opening in the plate; and each one of the adaptors defining an internal bore having a diameter sized to receive one of the racking rods therein; whereby the clamping means is engaged with the collar portion of a selected one of the adaptors to secure the complementary sized racking rod to the plate.

19. The protective shield defined in claim 18 in which each adaptor comprises first and second clamping members that are releasably secured together and are adapted to clamp the complementary sized racking rod therebetween.

20. The protective shield defined in claim 19, wherein the first and second clamping members are secured together by a plurality of fasteners.

* * * * *